United States Patent
Oh (10) Patent No.: US 9,164,312 B2
(45) Date of Patent: Oct. 20, 2015

(54) POLARIZING ADHESIVE ELEMENT, METHOD OF MANUFACTURING THE SAME AND DISPLAY APPARATUS HAVING THE SAME

(71) Applicant: Samsung Display Co., Ltd., Yongin, Gyeonggi-do (KR)

(72) Inventor: Se-Joon Oh, Suwon-si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 246 days.

(21) Appl. No.: 13/840,178

(22) Filed: Mar. 15, 2013

(65) Prior Publication Data

US 2014/0092330 A1    Apr. 3, 2014

(30) Foreign Application Priority Data

Sep. 28, 2012    (KR) .......................... 10-2012-0109371

(51) Int. Cl.
G02F 1/1335    (2006.01)
G02B 5/30    (2006.01)
G02F 1/1333    (2006.01)
G02F 1/13363    (2006.01)
G06F 3/041    (2006.01)

(52) U.S. Cl.
CPC ........ *G02F 1/133528* (2013.01); *G02B 5/3008* (2013.01); *G02B 5/3083* (2013.01); *G02F 1/13338* (2013.01); *G02F 1/13363* (2013.01); *G06F 3/041* (2013.01); *G02F 2202/28* (2013.01); *G06F 2203/04103* (2013.01); *Y10T 156/10* (2015.01)

(58) Field of Classification Search
CPC .................... G02F 1/133528; G02B 5/3008
USPC ..................................... 349/96–98
See application file for complete search history.

(56) References Cited

U.S. PATENT DOCUMENTS

| | | | | |
|---|---|---|---|---|
| 6,949,297 B2 * | 9/2005 | Yang et al. | .................... | 428/520 |
| 8,791,919 B2 * | 7/2014 | Cheng et al. | .................. | 345/173 |
| 2012/0327341 A1 * | 12/2012 | Honda et al. | .................. | 349/112 |
| 2013/0216805 A1 * | 8/2013 | Yasui et al. | .................. | 428/216 |

* cited by examiner

*Primary Examiner* — Dung Nguyen
(74) *Attorney, Agent, or Firm* — F. Chau & Associates, LLC (57) ABSTRACT

A polarizing adhesive element includes a pressure sensitive adhesive ("PSA"), a compensating film, a polarizing film, a supporting film and an optical clear adhesive ("OCA"). The PSA has adhesion. The compensating film is disposed on the PSA. The compensating film is configured to compensate a phase difference of a light. The polarizing film is disposed on the compensating film. The polarizing film is configured to polarize the light. The supporting film is disposed on the polarizing film. The supporting film supports the polarizing film. The OCA is disposed on the supporting film. The OCA has adhesion.

26 Claims, 7 Drawing Sheets

POLARIZING ADHESIVE ELEMENT, METHOD OF MANUFACTURING THE SAME AND DISPLAY APPARATUS HAVING THE SAME

CROSS-REFERENCE TO RELATED APPLICATION

This application claims priority to Korean Patent Application No. 10-2012-0109371, filed on Sep. 28, 2012, the disclosure of which is hereby incorporated by reference herein in its entirety.

1. TECHNICAL FIELD

The present disclosure relates to a polarizing adhesive element, a method of manufacturing the polarizing adhesive element and a display apparatus having the polarizing adhesive element. More particularly, the present disclosure relates to a polarizing adhesive element for increasing display quality and productivity, a method of manufacturing the polarizing adhesive element and a display apparatus having the polarizing adhesive element.

2. DISCUSSION OF THE RELATED ART

Generally, a liquid crystal display apparatus has a thin thickness, a light weight, and a low power consumption so that the liquid crystal display apparatus has been broadly used for devices such as, for example, a monitor, a laptop computer, a cellular phone, a television and so on. The liquid crystal display apparatus includes a liquid crystal display panel displaying an image using a light transmittance of a liquid crystal and a backlight assembly disposed under the liquid crystal display panel to provide light to the liquid crystal display panel.

Generally, the liquid crystal display apparatus includes two polarizing elements. A first polarizing element is disposed under the liquid crystal layer and a second polarizing element is disposed on or over the liquid crystal layer. The light provided to the liquid crystal display panel is polarized in a first direction when the light passes through the first polarizing element. A polarizing characteristic of the light is changed at the liquid crystal layer. And then, the light is transmitted or blocked when the light passes through the second polarizing element.

To manufacture display apparatuses having various functions, a method of bonding a display panel to other elements such as, for example, a panel, a film and a glass substrate using an adhesive film may be required.

When the display panel is bonded to other elements, a bubble may be generated at an adhesive surface so that a display quality may be deteriorated.

In addition, when the polarizing plate and the adhesive film are independently formed, manufacturing processes may become complex so that productivity may be decreased.

SUMMARY OF THE INVENTION

Exemplary embodiments of the present invention provide a polarizing adhesive element for increasing the display quality and the productivity of a display apparatus.

Exemplary embodiments of the present invention also provide a method of manufacturing the polarizing adhesive element.

Exemplary embodiments of the present invention still also provide a display apparatus including the polarizing adhesive element.

In an exemplary embodiment of a polarizing adhesive element according to the present invention, the polarizing adhesive element includes a pressure sensitive adhesive ("PSA"), a compensating film, a polarizing film, a supporting film and an optical clear adhesive ("OCA"). The PSA has adhesion. The compensating film is disposed on the PSA. The compensating film is configured to compensate a phase difference of a light. The polarizing film is disposed on the compensating film. The polarizing film is configured to polarize the light. The supporting film is disposed on the polarizing film. The supporting film supports the polarizing film. The OCA is disposed on the supporting film. The OCA has adhesion.

In an exemplary embodiment, the OCA may have a thickness greater than a thickness of the PSA.

In an exemplary embodiment, the thickness of the OCA may be no less than about 50 μm.

In an exemplary embodiment, a storage modulus of the OCA may be in a range of about $1.0*10^3$ Pa to about $1.0*10^5$ Pa.

In an exemplary embodiment, a gel fraction of the OCA may be no less than about 40%.

In an exemplary embodiment, the OCA may not include a hydroxyl group.

In an exemplary embodiment of a method of manufacturing a polarizing adhesive element according to the present invention, the method includes coating an OCA on a first release film, drying the OCA, forming a polarizing unit including a second release film, a PSA on the second release film, a compensating film on the PSA, a polarizing film on the compensating film and a supporting film on the polarizing film, and laminating the OCA on the polarizing unit so that the OCA makes contact with the supporting film of the polarizing unit.

In an exemplary embodiment of a display apparatus according to the present invention, the display apparatus includes a display panel, a polarizing adhesive element and an optical element. The display panel is configured to display an image. The polarizing adhesive element includes a PSA attached to the display panel, a compensating film disposed on the PSA which is configured to compensate a phase difference of a light, a polarizing film disposed on the compensating film which is configured to polarize the light, a supporting film disposed on the polarizing film supporting the polarizing film and an OCA disposed on the supporting film. The optical element is attached to the OCA.

In an exemplary embodiment, the OCA may have a thickness greater than a thickness of the PSA.

In an exemplary embodiment, the thickness of the OCA may be no less than about 50 μm.

In an exemplary embodiment, a storage modulus of the OCA may be in a range of about $1.0*10^3$ Pa to about $1.0*10^5$ Pa.

In an exemplary embodiment, a gel fraction of the OCA may be no less than about 40%.

In an exemplary embodiment, the optical element may include a first lens substrate, a second lens substrate and a liquid crystal layer disposed between the first lens substrate and the second lens substrate. The optical element may be configured to refract the image on the display panel to generate a three-dimensional image.

In an exemplary embodiment, the optical element may include a first barrier substrate, a second barrier substrate and a liquid crystal layer disposed between the first barrier substrate and the second barrier substrate. The optical element may be configured to selectively transmit the image on the display panel to generate a three-dimensional image.

In an exemplary embodiment, the optical element may include a touch panel configured to recognize a touch of a user.

In an exemplary embodiment, the touch panel may include a first touch substrate having a first electrode and a second touch substrate having a second electrode.

In an exemplary embodiment, the OCA may not include a hydroxyl group.

In an exemplary embodiment, a lower surface of the optical element making contact with the OCA may be uneven.

In an exemplary embodiment of a polarizing adhesive element according to the present invention, the polarizing adhesive element includes a first adhesive layer, a compensating film, a polarizing film, a supporting film and a second adhesive layer. The first adhesive layer has a first thickness. The compensating film is disposed on the first adhesive layer. The compensating film is configured to compensate a phase difference of a light. The polarizing film is disposed on the compensating film. The polarizing film is configured to polarize the light. The supporting film is disposed on the polarizing film. The supporting film supports the polarizing film. The second adhesive layer is disposed on the supporting film. The second adhesive layer has a second thickness greater than the first thickness.

In accordance with an exemplary embodiment of the present invention, a display apparatus is provided. The display apparatus includes a display panel including a first display substrate and a second display substrate facing the first display substrate and a liquid crystal layer disposed between the first and second display substrates, a polarizing element disposed on a lower surface of the first display substrate opposite to the liquid crystal layer, in which the polarizing element includes a first polarizing axis and is configured to polarize light in a direction of the first polarizing axis, and a polarizing adhesive element disposed on an upper surface of the second display substrate of the display panel. The polarizing adhesive element includes a pressure sensitive adhesive ("PSA") attached to the display panel, a compensating film on the PSA and configured to compensate a phase difference of a light, a polarizing film on the compensating film and configured to polarize the light, a supporting film on the polarizing film supporting the polarizing film and an optical clear adhesive ("OCA") disposed on the supporting film.

The display apparatus further includes an optical element attached to the polarizing adhesive element by the OCA, wherein the optical element includes at least one substrate and a display panel driver connected to the display panel, wherein the display panel driver is configured to generate a panel driving signal for driving the display panel.

According to the polarizing adhesive material, a method of manufacturing the polarizing adhesive material and the display apparatus having the polarizing adhesive material of an exemplary embodiment of the present invention, when the display panel and the optical element are attached to each other, a bubble may not be generated so that the display quality of the display apparatus may be increased. In addition, a polarizing element and an adhesive film are formed in a single process so that the productivity of the display apparatus may be increased.

BRIEF DESCRIPTION OF THE DRAWINGS

Exemplary embodiments of the present invention can be understood in more detail from the following detailed description taken in conjunction with the accompanying drawings, in which.

DETAILED DESCRIPTION OF EXEMPLARY EMBODIMENTS OF THE INVENTION

Hereinafter, exemplary embodiments of the present invention will be described in further detail with reference to the accompanying drawings.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Figure 1:
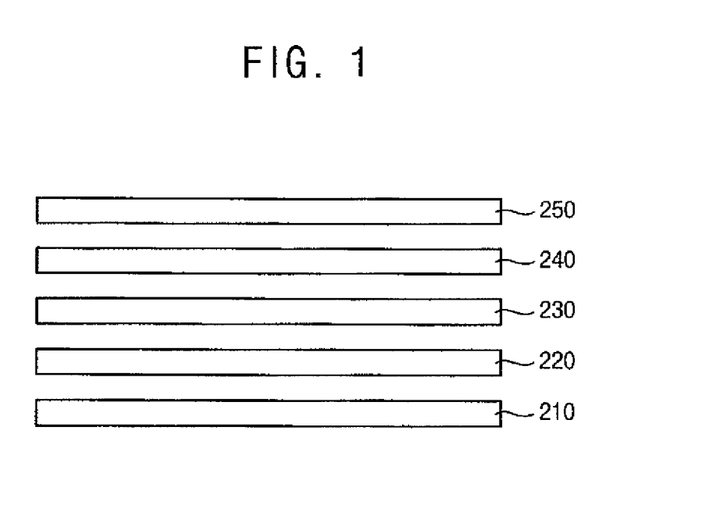
FIG. 1 is a block diagram illustrating a polarizing adhesive element according to an exemplary embodiment of the present invention.

FIG. 1 is a block diagram illustrating a polarizing adhesive element according to an exemplary embodiment of the present invention.

Referring to FIG. 1, the polarizing adhesive element includes, for example, a pressure sensitive adhesive ("PSA") 210, a compensating film 220, a polarizing film 230, a supporting film 240 and an optical clear adhesive ("OCA") 250. The PSA 210 may be a first adhesive layer. The OCA 250 may be a second adhesive layer.

The PSA 210 has adhesion. The PSA 210 attaches the polarizing adhesive element 200 to a first element. A thickness of the PSA 210 may be, for example, equal to or less than about 30 μm. The PSA 210 may include, for example, a polymer curing material. For example, in an embodiment, the PSA 210 may include an acrylic pressure-sensitive adhesive, a rubber-based pressure-sensitive adhesive, a vinylalky-lether-based pressure-sensitive adhesive, a silicon-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, and an epoxy-based pressure-sensitive adhesive. These pressure-sensitive adhesives may be used either alone or in combination of two or more thereof.

In an embodiment, a molecular weight of a material of the PSA 210 may be, for example, greater than a molecular weight of a material of the OCA 250.

For example, a surface of the first element attached to the PSA 210 may be flat.

The PSA 210 may have, for example, a refractive index substantially same as a refractive index of the first element. For example, the refractive index of the PSA 210 may be about 1.5.

The compensating film 220 is disposed on the PSA 210. The compensating film 220 compensates a phase difference of a light passing through the compensating film 220. Thus, a side visibility may be increased by the compensating film 220. The compensating film 220 has a relatively high light transmittance. Thus, a decrease of a luminance of the light by the compensating film 220 may be prevented.

The compensating film 220 may support the polarizing film 230.

The polarizing film 230 is disposed on the compensating film 220. The polarizing film 230 polarizes the light passing through the polarizing film 230.

For example, the polarizing film 230 includes polyvinyl alcohol ("PVA"). The polarizing film 230 may be manufactured by, for example, adsorbing iodine or a dichromatic dye on a PVA film and extending the PVA film in a direction.

Alternatively, the polarizing film 230 may include, for example, polycarbonate, polystyrene, polymethacrylate, polyethylene terephthalate, polyethylene naphtalate, polyester, polyethylene, polypropylene, polyvinylidene chloride, polyethylene vinyl alcohol, norbornene, poly methyl pentene, polyether ketone, polyether sulfone, polysulfone, polyether ketone imide, polyamide, polyacrylate, fluoropolymer, and so on.

The supporting film 240 is disposed on the polarizing film 230. The supporting film 240 supports the polarizing film 230. By the supporting film 240, a durability, a solidity, a thermal resistance and a moisture tolerance of the polarizing film 230 may be increased.

The supporting film 240 may include, for example, tri acetate cellulose ("TAC"). Alternatively, the supporting film 240 may include, for example, polyethyleneterephthalate, polyethylene glycol, polymethylmetacrylate, polycarbonate, acetylcellulose, polypropylene, polyamide, polyimide, polycarbodiimide, diacetyl cellulose, acetate butyrate cellulose, acetate propionatecellulose, polyether sulfone, polyurethane based resin, polyester, aromatic polyamide, polymers derived from vinyl chloride (e.g., polyvinyl chloride and vinyl chloride/vinyl acetate copolymer), polyvinyl alcohol, polysulfone, polyether, polynorbornene, polymethylpentene, polyether ketone, (meth)acrylonitrile, glass, and so on.

The OCA 250 is disposed on the supporting film 240. The OCA 250 has adhesion. The OCA 250 attaches the polarizing adhesive element 200 to a second element. The OCA 250 may include, for example, a polymer curing material. For example, in an exemplary embodiment, the OCA 250 may include an acrylic adhesive, a silicone adhesive, or an epoxy adhesive.

In an exemplary embodiment, a molecular weight of a material of the OCA 250 may be, for example, less than a molecular weight of a material of the PSA 210.

For example, a surface of the second element attached to the OCA 250 may be uneven. For example, the surface of the second element attached to the OCA 250 may have a protruding portion.

A thickness of the OCA 250 may be, for example, greater than a thickness of the PSA 210. The thickness of the OCA 250 may be, for example, equal to or greater than about 50 μm. The OCA 250 has a relatively thick thickness so that a bubble may not be generated when the OCA 250 is attached to the second element. If the thickness of the OCA 250 is less than about 50 μm, a bubble may be generated when the OCA 250 is attached to the second element having a protruding portion.

A storage modulus of the OCA 250 may be, for example, in a range of about $1.0*10^3$ Pa to about $1.0*10^5$ Pa. The storage modulus of the OCA 250 may be, for example, in a range of about $1.0*10^3$ Pa to about $1.0*10^5$ Pa so that an adhesion of the OCA is not decreased and a bubble may not be generated when the OCA 250 is attached to the second element. If the storage modulus of the OCA 250 is less than about $1.0*10^3$ Pa, an adhesion of the OCA 250 may be decreased. If the storage modulus of the OCA 250 is greater than about $1.0*10^5$ Pa, a bubble may be generated when the OCA 250 is attached to the second element.

A gel fraction of the OCA 250 is, for example, equal to or greater than about 40%. The OCA 250 has a relatively high gel fraction so that a bubble may not be generated when the OCA 250 is attached to the second element. If the gel fraction of the OCA 250 is less than about 40%, a bubble may be generated when the OCA 250 is attached to the second element.

The OCA 250 may include, for example, an acid free material. Thus, when an electrode is formed at a surface of the second element making contact with the OCA 250, the electrode may not be corroded. For example, the OCA 250 may not include a hydrophilic group. For example, the OCA 250 may not include hydroxyl group.

The OCA 250 may have a refractive index, for example, substantially the same as a refractive index of the second element. For example, the refractive index of the OCA 250 may be about 1.5.

Figure 2:
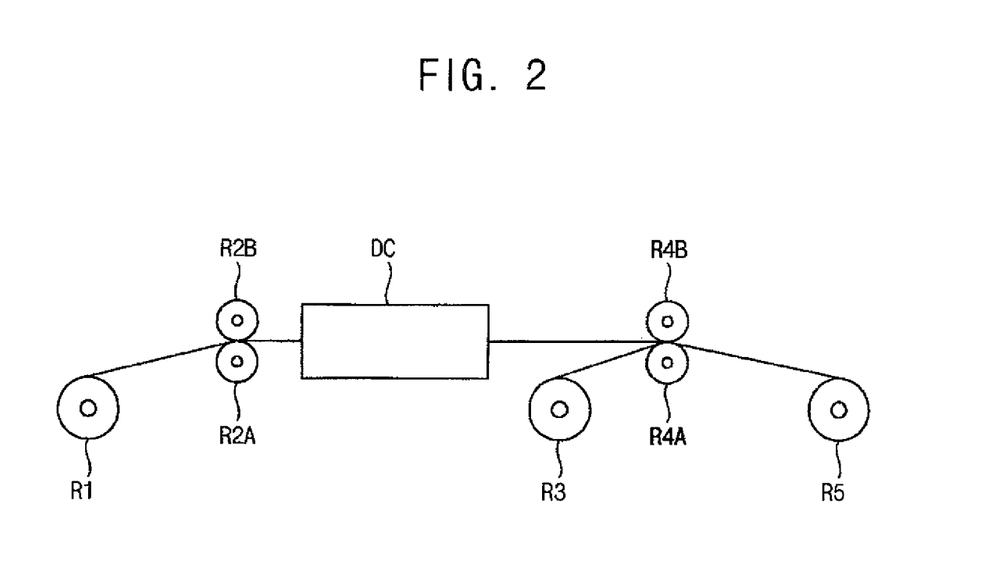
FIG. 2 is a conceptual diagram illustrating a method of manufacturing the polarizing adhesive element of FIG. 1.

FIG. 2 is a conceptual diagram illustrating a method of manufacturing the polarizing adhesive element of FIG. 1.

Referring to FIGS. 1 and 2, the polarizing adhesive element is manufactured using, for example, a roll to roll process. The roll to roll process means a process operated on a thin substrate which is continuously transferred from a supplying roll to a receiving roll.

A first release film is supplied from a first supplying roll R1. The OCA 250 is coated on the first release film using, for example, a first coating roll R2A and a second coating roll R2B.

The OCA 250 is dried when passing a drying chamber DC. The OCA 250 may be dried using, for example, hot air. Alternatively, the OCA 250 may, for example, be cured using an ultraviolet ray.

A polarizing unit is supplied from a second supplying roll R3. The polarizing unit includes, for example, a second release film, the PSA 210 on the second release film, the compensating film 220 on the PSA 210, the polarizing film 230 on the compensating film 220 and the supporting film 240 on the polarizing film 230.

The OCA 250 is, for example, laminated on the polarizing unit using a first laminating roll R4A and a second laminating roll R4B such that the supporting film 240 of the polarizing unit and the OCA 250 from the drying chamber 250 make contact with each other.

The laminated polarizing adhesive element is received at the receiving roll R5.

According to the present exemplary embodiment, when the polarizing adhesive element 200 is attached to the first element and the second element, a bubble may not be generated. In addition, a polarizing element and an adhesive film are integrally formed so that the productivity of a display apparatus may be increased as will be described in further detail hereinafter.

Figure 3:
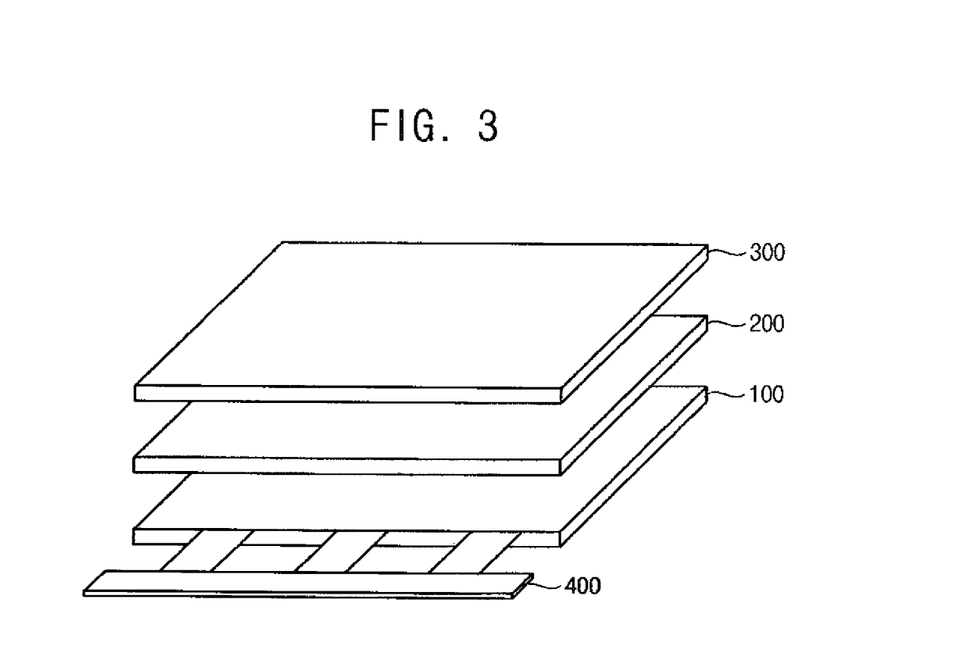
FIG. 3 is a block diagram illustrating a display apparatus according to an exemplary embodiment of the present invention.
Figure 4:
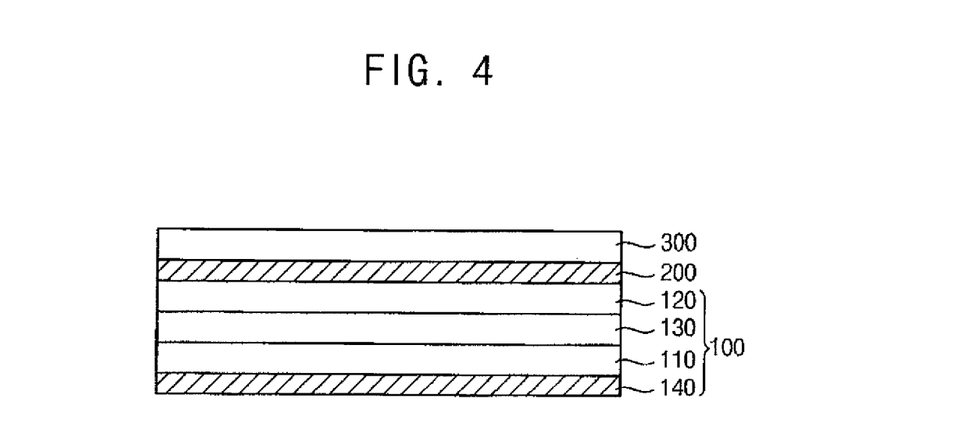
FIG. 4 is a cross-sectional view illustrating the display apparatus of FIG. 3.

FIG. 3 is a block diagram illustrating a display apparatus according to an exemplary embodiment of the present invention. FIG. 4 is a cross-sectional view illustrating the display apparatus of FIG. 3.

A display apparatus according to the present exemplary embodiment includes the polarizing adhesive element explained referring to FIGS. 1 and 2. Thus, the same reference numerals will be used to refer to the same or like parts as those described in connection with the polarizing adhesive element of FIGS. 1 to 2 and any repetitive explanation concerning the above elements will be omitted.

Referring to FIGS. 1, 3 and 4, the display apparatus includes, for example, a display panel 100, the polarizing adhesive element 200, an optical element 300 and a display panel driver 400.

The display panel 100 displays an image. The display panel 100 includes, for example, a first display substrate 110, a second display substrate 120 facing the first display substrate 110 and a liquid crystal layer 130 disposed between the first and second display substrates 110 and 120.

The display panel 100 includes a plurality of pixels. Each pixel includes, for example, a plurality of subpixels. The pixel may include, for example, a red subpixel, a green subpixel and a blue subpixel.

The display panel 100 includes a plurality of gate lines and a plurality of data lines. The subpixels are connected to the gate lines and the data lines. The gate lines extend in a first direction. The date lines extend in a second direction crossing the first direction. Alternatively, in an exemplary embodiment, the data lines may extend in the first direction and the gate lines may extend in the second direction crossing the first direction.

Each subpixel includes, for example, a switching element and a liquid crystal capacitor electrically connected to the switching element. The subpixel may further include, for example, a storage capacitor. The subpixels are disposed, for example, in a matrix form. The switching element may be, for example, a thin film transistor.

The gate lines, the data lines, pixel electrodes and storage electrodes may be disposed on the first display substrate. A common electrode may be disposed on the second display substrate.

A polarizing element 140 is disposed under the first display substrate 110. The polarizing element 140 has a first polarizing axis. The polarizing element 140 polarizes a light supplied from a backlight assembly in a direction of the first polarizing axis.

The polarizing adhesive element 200 is disposed on the display panel 100.

The polarizing adhesive element 200 includes, for example, the PSA 210, the compensating film 220, the polarizing film 230, the supporting film 240 and the OCA 250.

The PSA 210 is attached to the display panel 100. The PSA 210 may be attached to the second display substrate 120 of the display panel 100. An upper surface of the second display substrate 120 may, for example, be flat. However, exemplary embodiments of the present invention are not limited to the above-mentioned shape of the upper surface of the second display substrate 120.

The compensating film 220 is disposed on the PSA 210 to compensate a phase difference of a light.

The polarizing film 230 is disposed on the compensating film 220 to polarize the light provided from the compensating film 220. The polarizing film 230 has, for example, a second polarizing axis different from the first polarizing axis. The polarizing film 230 polarizes the light provided from the compensating film 220 in a direction of the second polarizing axis.

The supporting film 240 is disposed on the polarizing film 230 to support the polarizing film 230.

The OCA 250 is disposed on the supporting film 240. The OCA 250 attaches the polarizing adhesive element 200 to the optical element 300.

A thickness of the OCA 250 may be, for example, greater than a thickness of the PSA 210. The thickness of the OCA 250 may be, for example, equal to or greater than about 50 μm. A storage modulus of the OCA 250 may be, for example, in a range of about $1.0*10^3$ Pa to about $1.0*10^5$ Pa. A gel fraction of the OCA 250 is, for example, equal to or greater than about 40%. The OCA 250 may include, for example, an acid free material. For example, the OCA 250 may not include hydroxyl group.

The optical element 300 is disposed on the polarizing adhesive element 200. In the present exemplary embodiment, the optical element 300 converts the image on the display panel 100 into a three-dimensional ("3D") image. A structure of the optical element 300 may be explained referring to FIGS. 5 and 6 in detail.

The display panel driver 400 is connected to the display panel 100. The display panel driver 400 generates a panel driving signal for driving the display panel 100.

The display panel driver 400 includes, for example, a gate driver and a data driver.

The gate driver generates gate signals for driving the gate lines of the display panel 100. The gate driver sequentially outputs the gate signals to the gate lines.

The data driver generates data voltages for driving the data lines of the display panel 100. The data driver outputs the data voltages to the data lines.

Figure 5:
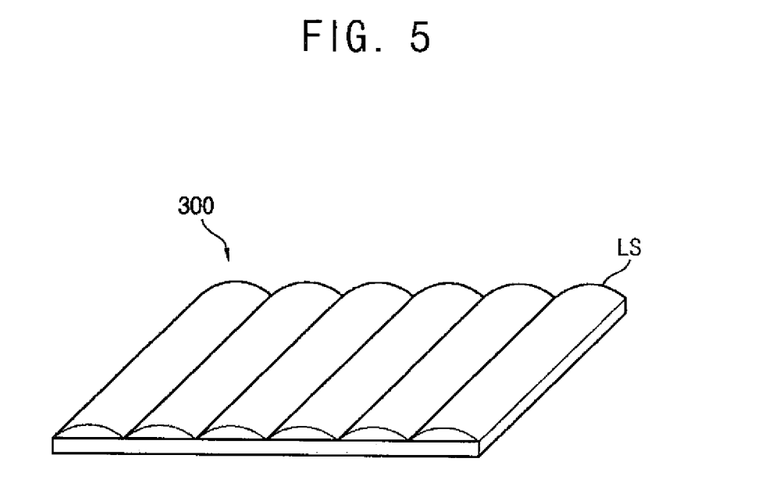
FIG. 5 is a perspective view illustrating an optical element of FIG. 3.
Figure 6:
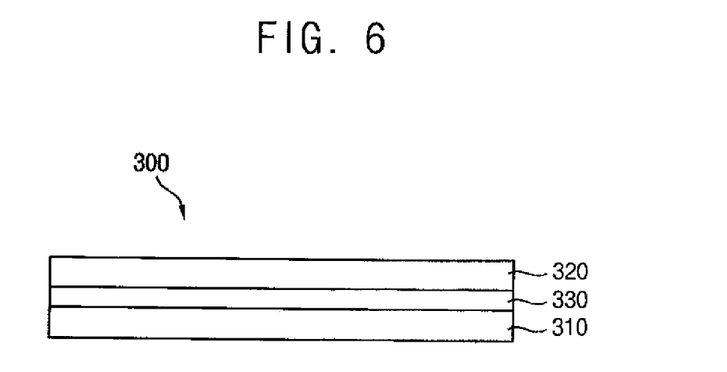
FIG. 6 is a cross-sectional view illustrating the optical element of FIG. 3.

FIG. 5 is a perspective view illustrating the optical element 300 of FIG. 3. FIG. 6 is a cross-sectional view illustrating the optical element 300 of FIG. 3.

Referring to FIGS. 3 to 6, the optical element 300 includes, for example, a plurality of lenticular lenses LS. The lenticular lenses LS may refract the image on the subpixel of the display panel 100 to a plurality of viewpoints to display the 3D image.

The optical element 300 includes, for example, a first lens substrate 310, a second lens substrate 320 facing the first lens substrate 310 and a liquid crystal layer 330 disposed between the first and second lens substrates 310 and 320.

For example, the optical element 300 may be a switchable lens module which is operated according to the driving mode including a two-dimensional ("2D") mode and a 3D mode. For example, the optical element 300 may be a liquid crystal lens module. The switchable lens module is turned on or off in response to the driving mode. For example, the switchable lens module is turned off in the 2D mode so that the display apparatus displays the 2D image. The switchable lens module is turned on in the 3D mode so that the display apparatus displays the 3D image.

According to the present exemplary embodiment, when the polarizing adhesive element 200 is attached to the display panel 100 and the optical element 300, a bubble may not be generated. Thus, the display quality of the display apparatus may be increased. In addition, a polarizing element and an adhesive film are integrally formed so that the productivity of the display apparatus may be increased.

Figure 7:
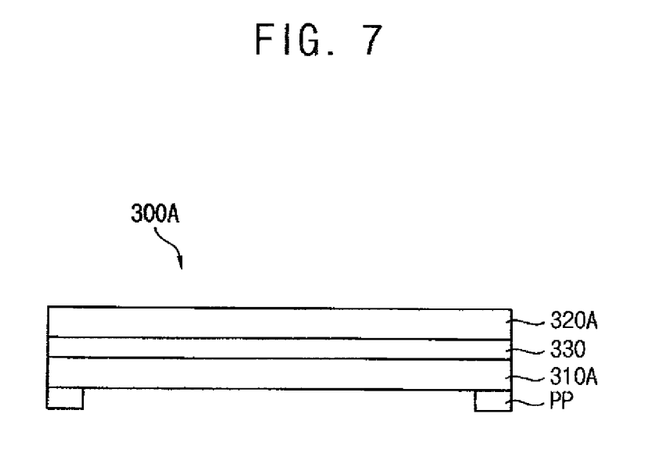
FIG. 7 is a cross-sectional view illustrating an optical element of a display apparatus according to an exemplary embodiment of the present invention.

FIG. 7 is a cross-sectional view illustrating an optical element of a display apparatus according to an exemplary embodiment of the present invention.

A display apparatus according to the present exemplary embodiment is substantially the same as the display apparatus described in connection with FIGS. 3 to 6 except that a protruding portion is formed on a lower surface of the optical element. Thus, the same reference numerals will be used to refer to the same or like parts as those described in connection with the display apparatus of FIGS. 3 to 6 and any repetitive explanation concerning the above elements will be omitted.

Referring to FIGS. 1, 3, 4 and 7, the display apparatus includes, for example, a display panel 100, the polarizing adhesive element 200, an optical element 300A and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300A is disposed on the polarizing adhesive element 200. The optical element 300A is attached to the polarizing adhesive element 200 by the OCA 250. In the present exemplary embodiment, the optical element 300A converts the image on the display panel 100 into the 3D image.

The display panel driver 400 is connected to the display panel 100. The display panel driver 400 generates a panel driving signal for driving the display panel 100.

The optical element 300A may include, for example, a plurality of lenticular lenses LS. The lenticular lenses LS may refract the image on the subpixel of the display panel 100 to a plurality of viewpoints to display the 3D image.

The optical element 300A includes, for example, a first lens substrate 310A, a second lens substrate 320A facing the first lens substrate 310A and a liquid crystal layer 330 disposed between the first and second lens substrates 310A and 320A.

In the present exemplary embodiment, a lower surface of the optical element 300A may, for example, be uneven. For example, the lower surface of the optical element 300A may have a convex and concave pattern.

For example, a protruding portion PP may be formed on the lower surface of the optical element 300A. A height of the protruding portion PP may be, for example, very small. For example, the protruding portion PP may be formed corresponding to an edge portion of the optical element 300A. The protruding portion PP may be a light blocking element to block a light leakage. The protruding portion PP may be, for example, a light blocking tape to block a light leakage. A position, a shape and a function of the protruding portion PP are not limited in the present exemplary embodiment.

If the lower surface of the optical element 300A is uneven, a bubble may be generated when the optical element 300A is attached to the polarizing adhesive element 200.

A thickness of the OCA 250 attaching the optical element 300A to the polarizing adhesive element 200 may be, for example, greater than a thickness of the PSA 210. The thickness of the OCA 250 may be, for example, equal to or greater than about 50 μM. The OCA 250 has a relatively thick thickness so that a bubble may not be generated when the OCA 250 is attached to the optical element 300A.

A storage modulus of the OCA 250 may be, for example, in a range of about $1.0*10^3$ Pa to about $1.0*10^5$ Pa. The storage modulus of the OCA 250 may be, for example, in a range of about $1.0*10^3$ Pa to about $1.0*10^5$ Pa so that an adhesion of the OCA is not decreased and a bubble may not be generated when the OCA 250 is attached to the optical element 300A.

A gel fraction of the OCA 250 is, for example, equal to or greater than about 40%. The OCA 250 has a relatively high gel fraction so that a bubble may not be generated when the OCA 250 is attached to the optical element 300A.

According to the present exemplary embodiment, when the polarizing adhesive element 200 is attached to the display panel 100 and the optical element 300A, a bubble may not be generated. For example, although the lower surface of the optical element 300A is uneven, a bubble may not be generated. Thus, the display quality of the display apparatus may be increased. In addition, a polarizing element and an adhesive film are integrally formed so that the productivity of the display apparatus may be increased.

Figure 8:
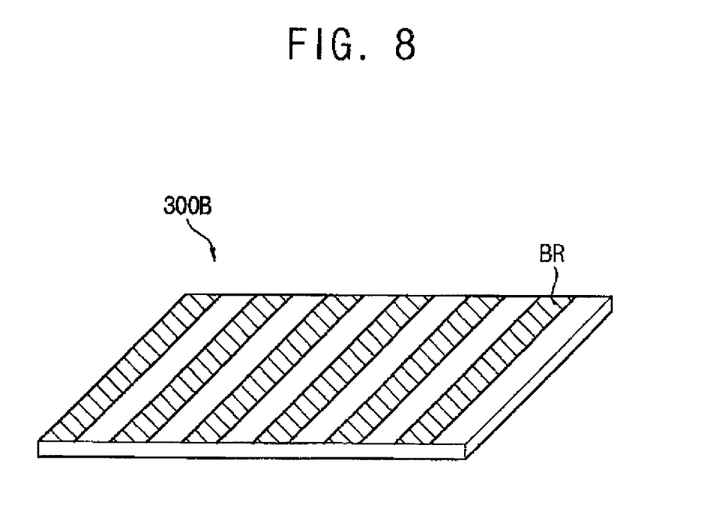
FIG. 8 is a perspective view illustrating an optical element of a display apparatus according to an exemplary embodiment of the present invention.
Figure 9:
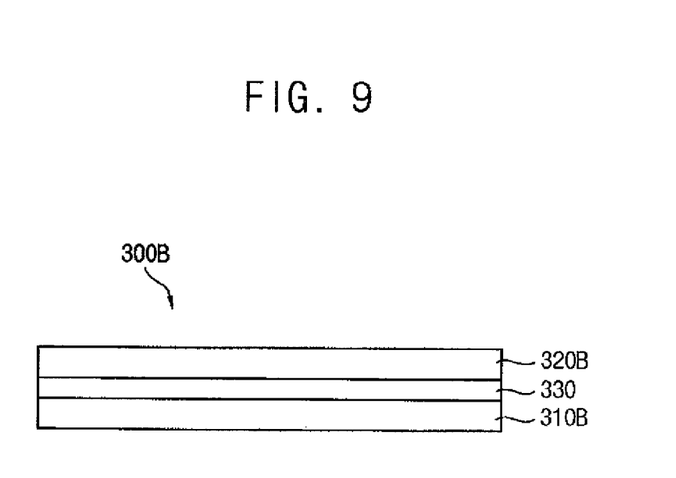
FIG. 9 is a cross-sectional view illustrating the optical element of FIG. 8.

FIG. 8 is a perspective view illustrating an optical element of a display apparatus according to an exemplary embodiment of the present invention. FIG. 9 is a cross-sectional view illustrating the optical element of FIG. 8.

A display apparatus according to the present exemplary embodiment is substantially the same as the display apparatus described in connection with FIGS. 3 to 6 except for the optical element. Thus, the same reference numerals will be used to refer to the same or like parts as those described in connection with the display apparatus of FIGS. 3 to 6 and any repetitive explanation concerning the above elements will be omitted.

Referring to FIGS. 1, 3, 4, 8 and 9, the display apparatus includes, for example, a display panel 100, the polarizing adhesive element 200, an optical element 300B and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300B is disposed on the polarizing adhesive element 200. The optical element 300B is attached to the polarizing adhesive element 200 by the OCA 250. In the present exemplary embodiment, the optical element 300B converts the image on the display panel 100 into the 3D image.

The display panel driver 400 is connected to the display panel 100. The display panel driver 400 generates a panel driving signal for driving the display panel 100.

The optical element 300B may include, for example, a plurality of barriers BR.

The barriers BR may selectively transmit the image on the subpixel of the display panel 100 to display the 3D image.

The optical element 300B includes, for example, a first barrier substrate 310B, a second barrier substrate 320B facing the first barrier substrate 310B and a liquid crystal layer 330 disposed between the first and second barrier substrates 310B and 320B.

For example, the optical element 300B may be a switchable barrier module which is operated according to the driving mode including a 2D mode and a 3D mode. For example, the optical element 300B may be a liquid crystal barrier module. The switchable barrier module is turned on or off in response to the driving mode. For example, the switchable barrier module is turned off in the 2D mode so that the display apparatus displays the 2D image. The switchable barrier module is turned on in the 3D mode so that the display apparatus displays the 3D image.

According to the present exemplary embodiment, when the polarizing adhesive element 200 is attached to the display panel 100 and the optical element 300B, a bubble may not be generated. Thus, the display quality of the display apparatus may be increased. In addition, a polarizing element and an adhesive film are integrally formed so that the productivity of the display apparatus may be increased.

Figure 10:
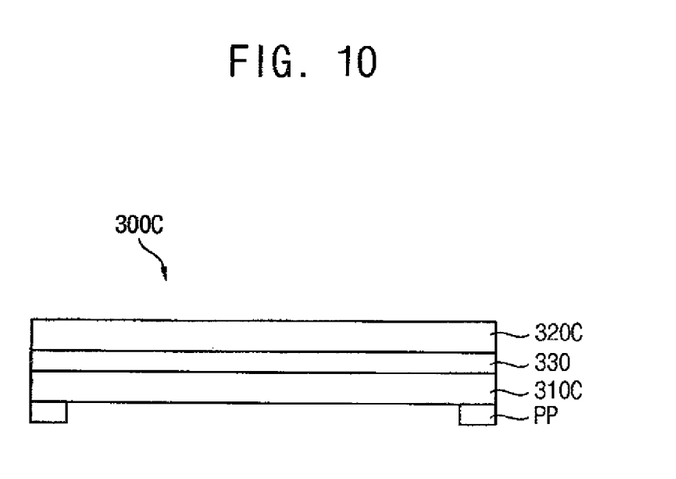
FIG. 10 is a cross-sectional view illustrating an optical element of a display apparatus according to an exemplary embodiment of the present invention.

FIG. 10 is a cross-sectional view illustrating an optical element of a display apparatus according to an exemplary embodiment of the present invention.

A display apparatus according to the present exemplary embodiment is substantially the same as the display apparatus described in connection with FIGS. 8 and 9 except that a protruding portion is formed on a lower surface of the optical element. Thus, the same reference numerals will be used to refer to the same or like parts as those described in connection with the display apparatus of FIGS. 8 and 9 and any repetitive explanation concerning the above elements will be omitted.

Referring to FIGS. 1, 3, 4 and 10, the display apparatus includes, for example, a display panel 100, the polarizing adhesive element 200, an optical element 300C and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300C is disposed on the polarizing adhesive element 200. The optical element 300C is attached to the polarizing adhesive element 200 by the OCA 250. In the present exemplary embodiment, the optical element 300C converts the image on the display panel 100 into the 3D image.

The display panel driver 400 is connected to the display panel 100. The display panel driver 400 generates a panel driving signal for driving the display panel 100.

The optical element 300C may include, for example, a plurality of barriers BR. The barriers BR may selectively transmit the image on the subpixel of the display panel 100 to display the 3D image.

The optical element 300C includes, for example, a first barrier substrate 310C, a second barrier substrate 320C facing the first barrier substrate 310C and a liquid crystal layer 330 disposed between the first and second barrier substrates 310C and 320C.

In the present exemplary embodiment, a lower surface of the optical element 300C may, for example, be uneven. For example, the lower surface of the optical element 300C may have a convex and concave pattern.

For example, a protruding portion PP may be formed on the lower surface of the optical element 300C. A height of the protruding portion PP may, for example, be very small. For example, the protruding portion PP may be formed corresponding to an edge portion of the optical element 300C. The protruding portion PP may, for example, be a light blocking element to block a light leakage. The protruding portion PP may be, for example, a light blocking tape to block a light leakage. A position, a shape and a function of the protruding portion PP are not limited in the present exemplary embodiment.

If the lower surface of the optical element 300C is uneven, a bubble may be generated when the optical element 300C is attached to the polarizing adhesive element 200.

A thickness of the OCA 250 attaching the optical element 300C to the polarizing adhesive element 200 may be, for example, greater than a thickness of the PSA 210. The thickness of the OCA 250 may be, for example, equal to or greater than about 50 µm. The OCA 250 has a relatively thick thickness so that a bubble may not be generated when the OCA 250 is attached to the optical element 300C.

A storage modulus of the OCA 250 may be, for example, in a range of about $1.0*10^3$ Pa to about $1.0*10^5$ Pa. The storage modulus of the OCA 250 may be, for example, in a range of about $1.0*10^3$ Pa to about $1.0*10^5$ Pa so that an adhesion of the OCA is not decreased and a bubble may not be generated when the OCA 250 is attached to the optical element 300C.

A gel fraction of the OCA 250 is, for example, equal to or greater than about 40%. The OCA 250 has a relatively high gel fraction so that a bubble may not be generated when the OCA 250 is attached to the optical element 300C.

According to the present exemplary embodiment, when the polarizing adhesive element 200 is attached to the display panel 100 and the optical element 300C, a bubble may not be generated. For example, although the lower surface of the optical element 300C is uneven, a bubble may not be generated. Thus, the display quality of the display apparatus may be increased. In addition, a polarizing element and an adhesive film are integrally formed so that the productivity of the display apparatus may be increased.

Figure 11:
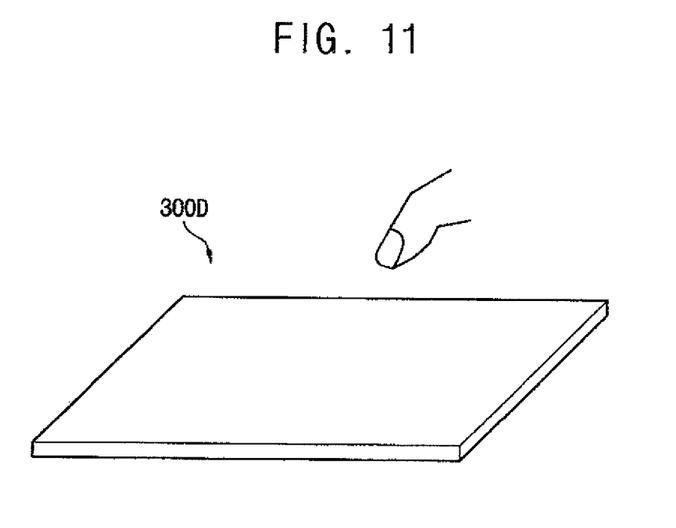
FIG. 11 is a perspective view illustrating an optical element of a display apparatus according to an exemplary embodiment of the present invention.
Figure 12:
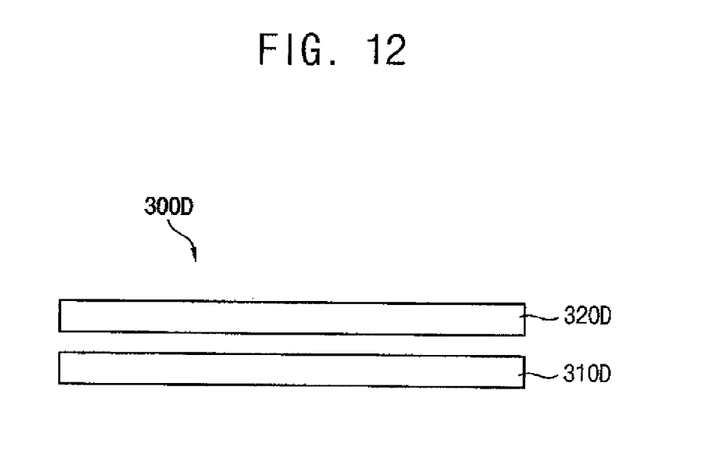
FIG. 12 is a cross-sectional view illustrating the optical element of FIG. 11.

FIG. 11 is a perspective view illustrating an optical element of a display apparatus according to an exemplary embodiment of the present invention. FIG. 12 is a cross-sectional view illustrating the optical element of FIG. 11.

A display apparatus according to the present exemplary embodiment is substantially the same as the display apparatus described in connection with FIGS. 3 to 6 except for the optical element. Thus, the same reference numerals will be used to refer to the same or like parts as those described in connection with the display apparatus of FIGS. 3 to 6 and any repetitive explanation concerning the above elements will be omitted.

Referring to FIGS. 1, 3, 4, 11 and 12, the display apparatus includes, for example, a display panel 100, the polarizing adhesive element 200, an optical element 300D and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300D is disposed on the polarizing adhesive element 200. The optical element 300D is attached to the polarizing adhesive element 200 by the OCA 250. In the present exemplary embodiment, the optical element 300D may recognize a touch of a user.

The display panel driver 400 is connected to the display panel 100. The display panel driver 400 generates a panel driving signal for driving the display panel 100.

For example, the optical element 300D may be a capacitive type touch panel. Alternatively, the optical element 300D may be, for example, a resistive type touch panel. Alternatively, the optical element 300D may be, for example, an infrared type touch panel.

The optical element 300D includes, for example, a first touch substrate 310D, a second touch substrate 320D facing the first touch substrate 310D. The first touch substrate 310D includes, for example, a first electrode. The second touch substrate 320D includes, for example, a second electrode.

For example, the first touch substrate 310D includes a plurality of the first electrodes. The second touch substrate 320D includes a plurality of the second electrodes. An extending direction of the first electrode may, for example, cross an extending direction of the second electrode.

Alternatively, the first touch substrate 310D includes, for example, a plurality of the first electrodes, and the second touch substrate 320D includes, for example, a single second electrode. Alternatively, the first touch substrate 310D includes, for example, a single first electrode and the second touch substrate 320D includes a plurality of the second electrodes. Alternatively, the first touch substrate 310D includes, for example, a single first electrode and the second touch substrate 320D includes a single second electrode.

According to the present exemplary embodiment, when the polarizing adhesive element 200 is attached to the display panel 100 and the optical element 300D, a bubble may not be generated. Thus, the display quality of the display apparatus may be increased. In addition, a polarizing element and an adhesive film are integrally formed so that the productivity of the display apparatus may be increased.

Figure 13:
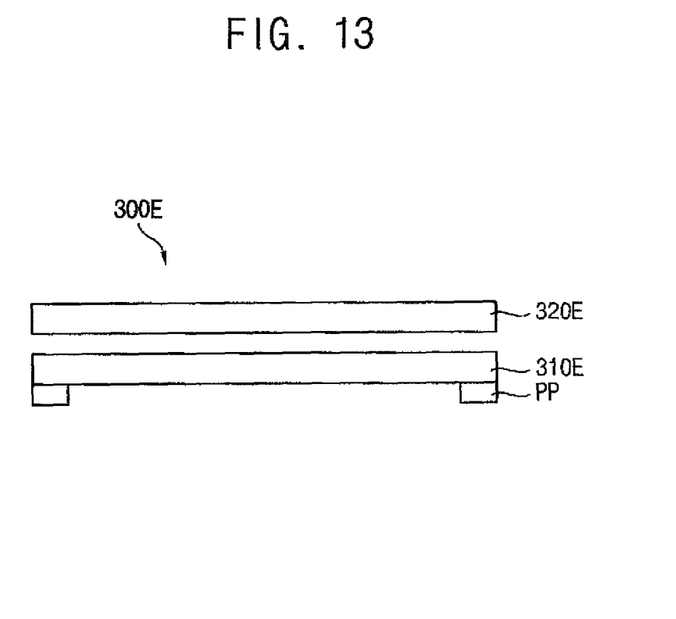
FIG. 13 is a cross-sectional view illustrating an optical element of a display apparatus according to an exemplary embodiment of the present invention.

FIG. 13 is a cross-sectional view illustrating an optical element of a display apparatus according to an exemplary embodiment of the present invention.

A display apparatus according to the present exemplary embodiment is substantially the same as the display apparatus described in connection with FIGS. 11 and 12 except that a protruding portion is formed on a lower surface of the optical element. Thus, the same reference numerals will be used to refer to the same or like parts as those described in connection with FIGS. 11 and 12 and any repetitive explanation concerning the above elements will be omitted.

Referring to FIGS. 1, 3, 4 and 13, the display apparatus includes, for example, a display panel 100, the polarizing adhesive element 200, an optical element 300E and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300E is disposed on the polarizing adhesive element 200. The optical element 300E is attached to the polarizing adhesive element 200 by the OCA 250. In the present exemplary embodiment, the optical element 300E may, for example, recognize a touch of a user.

The display panel driver 400 is connected to the display panel 100. The display panel driver 400 generates a panel driving signal for driving the display panel 100.

The optical element 300E includes, for example, a first touch substrate 310E, a second touch substrate 320E facing the first touch substrate 310E. The first touch substrate 310E includes, for example, a first electrode. The second touch substrate 320E includes, for example, a second electrode.

In the present exemplary embodiment, a lower surface of the optical element 300E may, for example, be uneven. For example, the lower surface of the optical element 300E may have a convex and concave pattern.

For example, a protruding portion PP may be formed on the lower surface of the optical element 300E. A height of the protruding portion PP may be, for example, very small. For example, the protruding portion PP may be formed corresponding to an edge portion of the optical element 300E. The protruding portion PP may be, for example, a light blocking element to block a light leakage. The protruding portion PP may be, for example, a light blocking tape to block a light leakage. A position, a shape and a function of the protruding portion PP are not limited in the present exemplary embodiment.

If the lower surface of the optical element 300E is uneven, a bubble may be generated when the optical element 300E is attached to the polarizing adhesive element 200.

A thickness of the OCA 250 attaching the optical element 300E to the polarizing adhesive element 200 may be, for example, greater than a thickness of the PSA 210. The thickness of the OCA 250 may be, for example, equal to or greater than about 50 μm. The OCA 250 has a relatively thick thickness so that a bubble may not be generated when the OCA 250 is attached to the optical element 300E.

A storage modulus of the OCA 250 may be, for example, in a range of about $1.0*10^3$ Pa to about $1.0*10^5$ Pa. The storage modulus of the OCA 250 may be, for example, in a range of about $1.0*10^3$ Pa to about $1.0*10^5$ Pa so that an adhesion of the OCA 250 is not decreased and a bubble may not be generated when the OCA 250 is attached to the optical element 300E.

A gel fraction of the OCA 250 is, for example, equal to or greater than about 40%. The OCA 250 has a relatively high gel fraction so that a bubble may not be generated when the OCA 250 is attached to the optical element 300E.

According to the present exemplary embodiment, when the polarizing adhesive element 200 is attached to the display panel 100 and the optical element 300E, a bubble may not be generated. For example, although the lower surface of the optical element 300E is uneven, a bubble may not be generated. Thus, the display quality of the display apparatus may be increased. In addition, a polarizing element and an adhesive film are integrally formed so that the productivity of the display apparatus may be increased.

Figure 14:
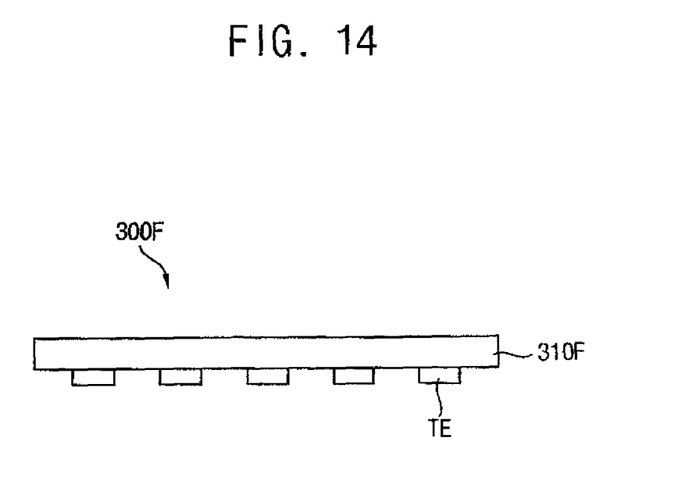
FIG. 14 is a cross-sectional view illustrating an optical element of a display apparatus according to an exemplary embodiment of the present invention.

FIG. 14 is a cross-sectional view illustrating an optical element of a display apparatus according to an exemplary embodiment of the present invention.

A display apparatus according to the present exemplary embodiment is substantially the same as the display apparatus described in connection with FIGS. 11 and 12 except that a protruding portion is formed on a lower surface of the optical element. Thus, the same reference numerals will be used to refer to the same or like parts as those described in connection with the display apparatus of FIGS. 11 and 12 and any repetitive explanation concerning the above elements will be omitted.

Referring to FIGS. 1, 3, 4 and 14, the display apparatus includes, for example, a display panel 100, the polarizing adhesive element 200, an optical element 300F and a display panel driver 400.

The display panel 100 displays an image. The display panel 100 is attached to the polarizing adhesive element 200 by the PSA 210.

The polarizing adhesive element 200 is disposed on the display panel 100. The polarizing adhesive element 200 includes, for example, the PSA 210, the compensating film 220, the polarizing film 230, the supporting film 240 and the OCA 250.

The optical element 300F is disposed on the polarizing adhesive element 200. The optical element 300F is attached to the polarizing adhesive element 200 by the OCA 250. In the present exemplary embodiment, the optical element 300F may, for example, recognize a touch of a user.

The display panel driver 400 is connected to the display panel 100. The display panel driver 400 generates a panel driving signal for driving the display panel 100.

The optical element 300F includes a touch substrate 310F. A touch electrode TE may be formed, for example, on a lower surface of the touch substrate 310F.

In the present exemplary embodiment, a lower surface of the optical element 300F may, for example, be uneven. For example, the lower surface of the optical element 300F may have the touch electrode TE.

If the lower surface of the optical element 300F is uneven, a bubble may be generated when the optical element 300F is attached to the polarizing adhesive element 200.

A thickness of the OCA 250 attaching the optical element 300F to the polarizing adhesive element 200 may be, for example, greater than a thickness of the PSA 210. The thickness of the OCA 250 may be, for example, equal to or greater than about 50 μm. The OCA 250 has a relatively thick thickness so that a bubble may not be generated when the OCA 250 is attached to the optical element 300F.

A storage modulus of the OCA 250 may be, for example, in a range of about $1.0*10^3$ Pa to about $1.0*10^5$ Pa. The storage modulus of the OCA 250 may be, for example, in a range of about $1.0*10^3$ Pa to about $1.0*10^5$ Pa so that an adhesion of the OCA 250 is not decreased and a bubble may not be generated when the OCA 250 is attached to the optical element 300F.

A gel fraction of the OCA 250 is, for example, equal to or greater than about 40%. The OCA 250 has a relatively high gel fraction so that a bubble may not be generated when the OCA 250 is attached to the optical element 300F.

In the present exemplary embodiment, the OCA 250 may include, for example, an acid free material. Thus, the touch electrode TE making contact with the OCA 250 may not be corroded. For example, the touch electrode TE may include indium tin oxide ("ITO"). Alternatively, in an embodiment, the touch electrode TE may include indium zinc oxide ("IZO").

For example, the OCA 250 may not include a hydrophilic group. For example, the OCA 250 may not include hydroxyl group.

According to the present exemplary embodiment, when the polarizing adhesive element 200 is attached to the display panel 100 and the optical element 300F, a bubble may not be generated. For example, although the touch electrode TE is formed on the lower surface of the optical element 300F, a bubble may not be generated. Thus, the display quality of the display apparatus may be increased. In addition, a polarizing element and an adhesive film are integrally formed so that the productivity of the display apparatus may be increased.

As explained above, according to the polarizing adhesive material, a method of manufacturing the polarizing adhesive material and the display apparatus having the polarizing adhesive material of an exemplary embodiment of the present invention, a bubble may not be generated in an adhesion process so that the display quality of the display apparatus may be increased. In addition, a polarizing element and an adhesive film are formed in a single process so that the productivity of the display apparatus may be increased.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A polarizing adhesive element comprising:
   a pressure sensitive adhesive ("PSA") having adhesion;
   a compensating film disposed on the PSA and configured to compensate a phase difference of a light;
   a polarizing film disposed on the compensating film and configured to polarize the light;
   a supporting film disposed on the polarizing film and supporting the polarizing film; and
   an optical clear adhesive ("OCA") disposed on the supporting film and having adhesion,
   wherein a molecular weight of a material of the OCA is less than a molecular weight of a material of the PSA.

2. The polarizing adhesive element of claim 1, wherein the OCA has a thickness greater than a thickness of the PSA.

3. The polarizing adhesive element of claim 2, wherein the thickness of the OCA is no less than about 50 μm.

4. The polarizing adhesive element of claim 1, wherein a storage modulus of the OCA is in a range of about $1.0*10^3$ Pa to about $10*10^5$ Pa.

5. The polarizing adhesive element of claim 1, wherein a gel fraction of the OCA is no less than about 40%.

6. The polarizing adhesive element of claim 5, wherein the OCA does not include a hydroxyl group.

7. A display apparatus comprising: a display panel configured to display an image;
   a polarizing adhesive element including a pressure sensitive adhesive ("PSA") attached to the display panel, a compensating film disposed on the PSA and configured to compensate a phase difference of a light, a polarizing film disposed on the compensating film and configured to polarize the light, a supporting film disposed on the polarizing film supporting the polarizing film and an optical clear adhesive ("OCA") disposed on the supporting film; and
   an optical element attached to the OCA,
   wherein a molecular weight of a material of the OCA is less than a molecular weight of a material of the PSA.

8. The display apparatus of claim 7, wherein the OCA has a thickness greater than a thickness of the PSA.

9. The display apparatus of claim 8, wherein the thickness of the OCA is no less than about 50 μm.

10. The display apparatus of claim 7, wherein a storage modulus of the OCA is in a range of about $1.0*10^3$ Pa to about $1.0*10^5$ Pa.

11. The display apparatus of claim 7, wherein a gel fraction of the OCA is no less than about 40%.

12. The display apparatus of claim 7, wherein the optical element includes a first lens substrate, a second lens substrate and a liquid crystal layer disposed between the first lens substrate and the second lens substrate, and the optical element is configured to refract the image on the display panel to generate a three-dimensional image.

13. The display apparatus of claim 7, wherein the optical element includes a first barrier substrate, a second barrier substrate and a liquid crystal layer disposed between the first barrier substrate and the second barrier substrate, and the optical element is configured to selectively transmit the image on the display panel to generate a three-dimensional image.

14. The display apparatus of claim 7, wherein the optical element includes a touch panel configured to recognize a touch of a user.

15. The display apparatus of claim 14, wherein the touch panel includes a first touch substrate having a first electrode and a second touch substrate having a second electrode.

16. The display apparatus of claim 14, wherein the OCA does not include a hydroxyl group.

17. The display apparatus of claim 7, wherein a lower surface of the optical element making contact with the OCA is uneven.

18. A polarizing adhesive element comprising:
a first adhesive layer having a first thickness;
a compensating film disposed on the first adhesive layer and configured to compensate a phase difference of a light;
a polarizing film disposed on the compensating film and configured to polarize the light;
a supporting film disposed on the polarizing film and supporting the polarizing film; and
a second adhesive layer disposed on the supporting film and having a second thickness greater than the first thickness,
wherein a molecular weight of a material of the second adhesive layer is less than a molecular weight of a material of the first adhesive layer.

19. A display apparatus comprising:
a display panel including a first display substrate and a second display substrate facing the first display substrate and a liquid crystal layer disposed between the first and second display substrates;
a polarizing element disposed on a lower surface of the first display substrate opposite to the liquid crystal layer, wherein the polarizing element includes a first polarizing axis and is configured to polarize light in a direction of the first polarizing axis;
a polarizing adhesive element disposed on an upper surface of the second display substrate of the display panel, wherein the polarizing adhesive element includes a pressure sensitive adhesive ("PSA") attached to the display panel, a compensating film on the PSA and configured to compensate a phase difference of a light, a polarizing film on the compensating film and configured to polarize the light, a supporting film on the polarizing film supporting the polarizing film and an optical clear adhesive ("OCA") disposed on the supporting film;
an optical element attached to the polarizing adhesive element by the OCA, wherein the optical element includes at least one substrate; and
a display panel driver connected to the display panel, wherein the display panel driver is configured to generate a panel driving signal for driving the display panel,
wherein a molecular weight of a material of the OCA is less than a molecular weight of a material of the PSA.

20. The display apparatus of claim 19, wherein the optical element includes a plurality of lenticular lenses disposed on a surface of the at least one substrate, and wherein the lenticular lenses are configured to refract an image on a subpixel of the display panel to a plurality of viewpoints to display a 3D image.

21. The display apparatus of claim 19, wherein the optical element includes a protruding portion disposed on a lower surface of the at least one substrate.

22. The display apparatus of claim 21, wherein the protruding portion is disposed on an edge portion of the lower surface of the at least one substrate of the optical element.

23. The display apparatus of claim 22, wherein the protruding portion is a light blocking element configured to block light leakage.

24. The display apparatus of claim 23, wherein the protruding portion is a light blocking tape.

25. The display apparatus of claim of claim 19, wherein the optical element includes a plurality of barriers disposed on a surface of the at least one substrate and wherein the barriers are configured to selectively transmit an image on a subpixel of the display panel to display a 3D image.

26. The display apparatus of claim 19, wherein the at least one substrate of the optical element is a touch substrate including a touch electrode disposed on a lower surface of the touch substrate.

\* \* \* \* \*